Nov. 12, 1968  M. AGOSTINONE  3,410,567
LIGHT-ALLOY PISTON WITH STEEL-ARMORED GROOVES
Filed March 31, 1966
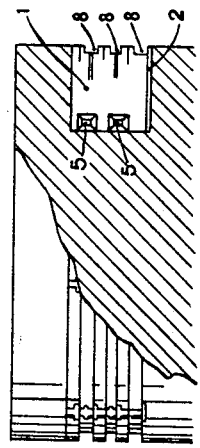
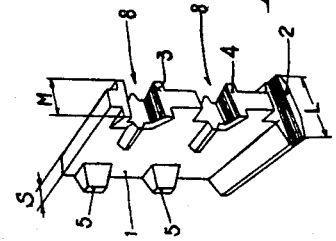
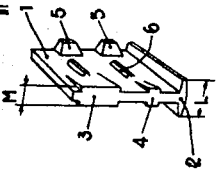
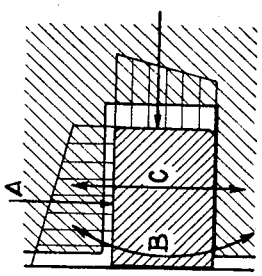
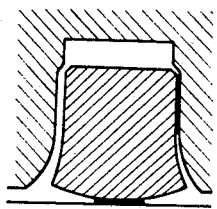
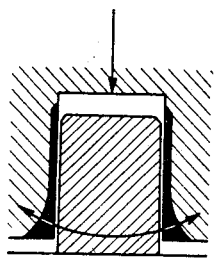
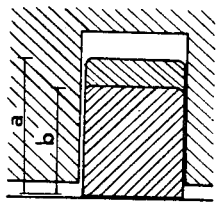
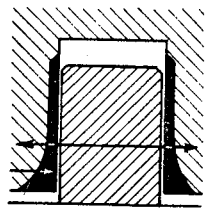

United States Patent Office 3,410,567
Patented Nov. 12, 1968

3,410,567
LIGHT-ALLOY PISTON WITH STEEL-
ARMORED GROOVES
Mario Agostinone, Via Boifava 25,
Brescia, Italy
Filed Mar. 31, 1966, Ser. No. 539,138
Claims priority, application Italy, Apr. 10, 1965,
757,363
2 Claims. (Cl. 277—189.5)

ABSTRACT OF THE DISCLOSURE

A light-weight alloyed piston with cast plurality of steel plates radially located along the periphery of the piston. The plate has a base with a width greater than the average thickness of the plate so as to absorb part of the forces exerted on the rings.

---

The present invention relates to light-alloy pistons for internal combustion engines, compressors, pumps, and the like, such pistons having grooves for housing the piston rings, which grooves are armored with steel plates.

It is the main object of the present invention to provide for a light-alloy piston suitable for internal combustion engines, compressors, pumps, and the like, which piston is provided with grooves which are armored or protected by steel plates, such plates being pre-cast directly with the piston and having a unique and particular structural configuration.

Other objects and advantages of the present invention will become apparent from the following detailed embodiments thereof and from the drawings in which:

FIGURE 1 represents schematically a front view of the comparative relationship between worn and new piston rings;

FIGURES 2–5 show diagrammatically the various forces acting upon the ring and the resulting consequences upon the surfaces of the ring;

FIGURES 6–7 show in perspective, frontal and back views of the armored plate of the invention;

FIGURE 8 shows the plate, again in perspective, as it appears in the piston, that is with the grooves for the rings clearly shown; and FIGURE 9 shows a piston partially cut away and provided with the plates of the invention.

In the field of light-alloy pistons suitable for internal combustion engines, compressors, pumps, and the like, the sealing of the combustion gases is essentially entrusted to the rings, which perform such function by retaining a very close tolerance between the outer surface thereof and the inner surfaces of the cylinder walls.

The sealing action of the ring, therefore, depends essentially on the degree of wear-resistance of the outer surfaces of the ring, on which depends also the correct position of the piston groove.

If the piston rings are able to resist abrasion, then the sealing of the combustion gases is not subjected to substantial variations, even after a progressive radial wearing of the rings. This is so, because the surface that bears against the cylinder realigns itself correctly. This is shown clearly in FIGURE 1, in which the letter "a" indicates the new ring and the letter "b" represents the correctly worn ring.

It is known that various forces act upon the piston ring (see FIGURE 2), and specifically: friction force A of the combustion gas, forces B caused by the friction of the ring against the cylinder walls, and forces C caused by the inertia of the ring mass.

These forces press against the surfaces of the groove for the rings and are responsible for the wearing action, the degree of such wearing varying proportionately with the use of the mechanical element itself.

In modern diesel engines, the high pressure exerted upon the compression rings and, especially, upon the combustion ring cause a considerable wearing of the piston grooves, which grooves, due to the high operating temperature, have a relatively low wear resistance.

Under the combined action of the various forces mentioned hereabove (friction force, gas expansion force and inertia force) the grooves tend to change cross-sectionally their shape, namely, from rectangular to trapezoidal. This trapezoidal configuration becomes progessively more and more pronounced (see FIGURES 3 and 4) as the use of the piston increases, with the attendant diminution of sealing ability of the ring.

At the same time, the progressive wearing of the groove causes an ever more pronounced deformation of the ring, due to its being subjected to the radial pressure of the combustion gases, with the result that its outer bearing surface assumes a somewhat convex configuration (see FIGURE 5), thus reducing also the sealing ability of the surface of the ring opposing the cylinder walls.

The reduction of the sealing surfaces of the rings permits the entrance of the combustion gases into the piston cylinder with the consequent destruction of the lubricating film; the temperature in the zone in question increases considerably, with the attendant rapid decay of the wear resistance of the material of the piston itself.

Finally, the wear of the grooves increases rapidly and it, eventually reach a point where the combustion rings ultimately fail and break. In addition, when finally the looseness of the ring reaches a critical point, failure occurs even in the sections between the rings. In engines with rich combustion mixtures, the conditions of temperature and the disadvantages mentioned hereabove are apt to manifest themselves even more rapidly and with more serious consequences.

From the above, it can be readily understood that, in light-alloy pistons, one way of combating the wear of the grooves is by armoring such grooves with materials possessing a high degree of wear resistance at the operating temperatures of the engine.

Many solutions to the problem have been heretofore presented, but serious difficulties have always been encountered, because the elements suggested (usually rings made of cast iron or steel) form a close structure and, consequently, do not lend themselves to the different coefficients of expansion of the aluminum-type alloys and have a tendency to move within their respective seats. Furthermore, the suggested solutions create an obstacle to the transmission of heat.

One particular solution to the problem faced by industry was sought among the so-called open-type structures, which as it is well known do not offer resistance to the expansion of the piston. This solution involved the insertions of steel plates in the grooves, the plates being positioned vertically and horizontally, without a connecting medium therebetween. However, this approach also failed to give satisfactory results, because the thus inserted plates behave practically as load transducers from the ring to the substantially equivalent surface of the aluminum alloy upon which the plates rest. As a consequence, the aluminum surface which receives the load transmitted by the plates, behaves just as if it had received the load directly from the ring, with the additional disadvantage that the plate moves, thus causing very rapidly more serious situations than those which it is purported to eliminate.

For sake of clarity, if these plates receive a given load X on a given surface Y thereof and transfer it to the corresponding substantially equal surface Y′ of the aluminum alloy, upon which they rest, then the plates are, in a sense, an inert and superfluous body inserted between the ring and the aluminum alloy.

The invention hereinafter presented, conversely, offers a highly satisfactory solution to the problem in question because, besides the known advantages afforded by the open-type structures and by the use of alternate steel and aluminum surfaces, it introduces a unique and novel principle which distinguishes the present invention from the heretofore proposed methods.

The principle of this invention consists in providing the steel plates with a greater base and with additional contact elements which are capable of distributing the load received over a considerably greater surface of corresponding light-weight alloy. The load-area ratio of the alloy is, therefore, considerably lesser than that received and transmitted by a conventional plate.

With reference now to FIGURES 6–9 of the drawings, the invention contemplates the insertion by casting within the piston of a plurality of plates 1, of steel or other suitable material. Each plate has a base 2 with a width S which is predetermined with respect to the load to be absorbed and to the load to be transferred to the alloy upon which the plate rests.

In juxtaposition with the grooves 8 of the rings, there are provided in the plate enlargements 3 and 4 of width M greater than the width S mentioned above, so as to absorb a predetermined load without excessively widening the body of the plate itself.

Behind, or in the back, of each plate 1 there are provided other enlargements 5, which are staggered with respect to the first-mentioned enlargements and serve the purposes of anchoring each plate in the piston casting and of reacting to any load eccentricity.

The plates 1 possess, finally, the lateral wings 6, which are provided in the region of the enlargements 3 and 4 and have the function of further increasing the surface for transducing the load received. These wing elements are positioned radially in corresponding recesses of the piston head, without any tie therebetween, so that they may follow freely any thermal expansion of the piston.

The plates distribute the load received by the rings over an alloy surface capable of absorbing it without loss in the alloy properties, due to the enlarged bearing resting surface formed by the base 2 and the wings 6.

The continuity of the resting plane of the ring, which is alternately of alloy and of steel, is maintained uniform and perfect and the transmission of heat is not hindered. The armored grooves of the rings preserve their rectangular configuration and hold the ring in its correct position with respect to the cylinder. Furthermore, the wear of the grooves is minimized and, consequently, the looseness of the rings does not reach critically dangerous proportions.

What is claimed is:

1. In a light-alloy piston for internal combustion engines, compressors, pumps, and the like, having armored ring grooves, a plate comprising
   (a) a base having a width greater than the thickness of the plate,
   (b) a plurality of protrusions positioned in planar juxtaposition with the ring grooves and having a width greater than the thickness of the plate, and
   (c) wings extending laterally from the sides of the plate for the distribution of the load received by the plate during operation.

2. The plate in accordance with claim 4, wherein said protrusions are positioned on said plate in staggered relationship with one another.

References Cited

UNITED STATES PATENTS 2,278,958   4/1942   White et al. _____ 277—189.5

FOREIGN PATENTS 251,051   11/1926   Italy.
1,042,956   11/1958   Germany.

SAMUEL ROTHBERG, *Primary Examiner.*